United States Patent
Rensburg et al.

(10) Patent No.: US 9,967,520 B1
(45) Date of Patent: May 8, 2018

(54) METHOD AND SYSTEM FOR ENHANCED CONFERENCE MANAGEMENT

(71) Applicant: RingCentral, Inc., Belmont, CA (US)

(72) Inventors: Christopher Van Rensburg, Foster City, CA (US); Vlad Vendrow, Reno, NV (US)

(73) Assignee: RingCentral, Inc., Belmont, CA (US)

( * ) Notice: Subject to any disclaimer, the term of this patent is extended or adjusted under 35 U.S.C. 154(b) by 0 days. days.

(21) Appl. No.: 15/640,393

(22) Filed: Jun. 30, 2017

(51) Int. Cl.
| H04N 7/15 | (2006.01) |
| H04N 7/14 | (2006.01) |
| G10L 25/63 | (2013.01) |
| G10L 15/22 | (2006.01) |

(52) U.S. Cl.
CPC ............ *H04N 7/147* (2013.01); *G10L 15/22* (2013.01); *G10L 25/63* (2013.01); *H04N 7/15* (2013.01)

(58) Field of Classification Search
None
See application file for complete search history.

(56) References Cited

U.S. PATENT DOCUMENTS

| 7,916,165 B2 | 3/2011 | Ferren et al. |
| 8,320,257 B2 | 11/2012 | Srivastava et al. |
| 8,495,753 B2 | 7/2013 | Motoyama et al. |
| 8,825,760 B1 * | 9/2014 | Harris ............... G06Q 10/10 709/204 |
| 9,092,928 B2 | 7/2015 | Cohen et al. |
| 9,807,102 B1 * | 10/2017 | Modras ............. H04L 63/105 |
| 2009/0006161 A1 | 1/2009 | Chen et al. |
| 2011/0282706 A1 | 11/2011 | Ezra et al. |
| 2013/0060593 A1 | 3/2013 | Motoyama |
| 2013/0060594 A1 | 3/2013 | Motoyama |
| 2014/0200944 A1 | 7/2014 | Henriksen et al. |
| 2015/0046370 A1 | 2/2015 | Libin et al. |
| 2015/0229838 A1 * | 8/2015 | Hakim ............. H04N 5/23293 348/333.02 |
| 2015/0264316 A1 * | 9/2015 | Sanaullah ........... H04M 3/568 348/14.07 |
| 2016/0117624 A1 | 4/2016 | Flores et al. |
| 2016/0360382 A1 * | 12/2016 | Gross .................. G06F 3/0488 |
| 2017/0154166 A1 * | 6/2017 | Klein .................. G06F 19/363 |

\* cited by examiner

*Primary Examiner* — Creighton Smith
(74) *Attorney, Agent, or Firm* — Finnegan, Henderson, Farabow, Garrett & Dunner LLP

(57) ABSTRACT

The present disclosure provides methods and systems for enhanced conference management. According to some embodiments, a conference management server for enhanced conference management is provided. The conference management server comprises a memory storing a set of instructions, and at least one processor configured to execute the instructions to: receive, from a user device, conference information including a conference subject and an identification of at least one participant; determine, based on the received conference information, a degree of formality for a conference; and send a conference notification to one or more devices or participants identified based on the conference information, the conference notification including information reflecting the degree of formality for the conference.

19 Claims, 11 Drawing Sheets

METHOD AND SYSTEM FOR ENHANCED CONFERENCE MANAGEMENT

TECHNICAL FIELD

The present disclosure generally relates to the field of conferencing systems and, more particularly, methods and systems for enhanced conference management.

BACKGROUND

In a conferencing system, when a user tries to schedule a conference, a conference notification is generated and sent to a plurality of participants. Generally, the notification includes information such as the conference date, time, location, and the subjects of the conference. A participant who receives the notification may be directed to the indicated location at the indicated time. Alternatively, in teleconferencing systems, a participant may log into a conferencing platform at the indicated time and use devices with a camera and a microphone to capture and transmit audio/video signals to communicate with other participants.

However, in existing conferencing systems, the conference notification does not include sufficient information to assist the participants in their preparation for the conference. For example, the conference notification does not include information regarding whether the conference requires formal business attire or a formal tone of speaking. As another example, the same notification is usually sent to all of the participants at the same time, regardless of the different roles of each participant in the conference or the tasks certain participants need to complete prior to or at the conference. Further, in teleconferencing environments, due to the fact that participants are often located in different geographical locations, the participants often need notifications with sufficient details in order to properly prepare for the conference. Another problem concerns detecting, during a conference, inappropriate social demeanor of the participants, such as whether a participant is speaking too fast or too formally or whether a participant needs to adjust his physical appearance. In addition, a participant may wish to avoid embarrassment by suspending video display signals when he suddenly sneezes or coughs.

In view of these concerns, methods and systems that provide enhanced conference notifications and social cues to the participants are desired.

SUMMARY

Embodiments consistent with the present disclosure provide methods and systems for enhanced conference management.

In one embodiment of the present disclosure, a conference management server is disclosed. The conference management server comprises a memory storing a set of instructions, and at least one processor configured to execute the instructions to: receive, from a user device, conference information including a conference subject and an identification of at least one participant; determine a degree of formality for a conference based on the received conference information; and send a conference notification to one or more user devices identified based on the conference information, the conference notification including information reflecting the degree of formality.

In another embodiment, a computer-implemented method for enhanced conference management is disclosed. The method comprises: receiving, from a user device, conference information including a conference subject and an identification of at least one participant; determining a degree of formality for a conference based on the received conference information; and sending a conference notification to one or more user devices identified based on the conference information, the conference notification including information reflecting the degree of formality.

In another embodiment, a non-transitory computer readable medium is disclosed. The non-transitory computer readable medium stores a set of instructions which, when executed by at least one processor of a conference management server, causes the conference management server to perform a method for enhanced conference management. The method comprises: receiving, from a user device, conference information including a conference subject and an identification of at least one participant; determining a degree of formality for a conference based on the received conference information; and sending a conference notification to one or more user devices identified based on the conference information, the conference notification including information reflecting the degree of formality.

The foregoing general description and the following detailed description are exemplary and explanatory only and are not restrictive of the claims.

BRIEF DESCRIPTION OF THE DRAWINGS

The accompanying drawings, which are incorporated in and constitute part of this disclosure, together with the description, illustrate and serve to explain the principles of various example embodiments.

DETAILED DESCRIPTION

Figure 1:
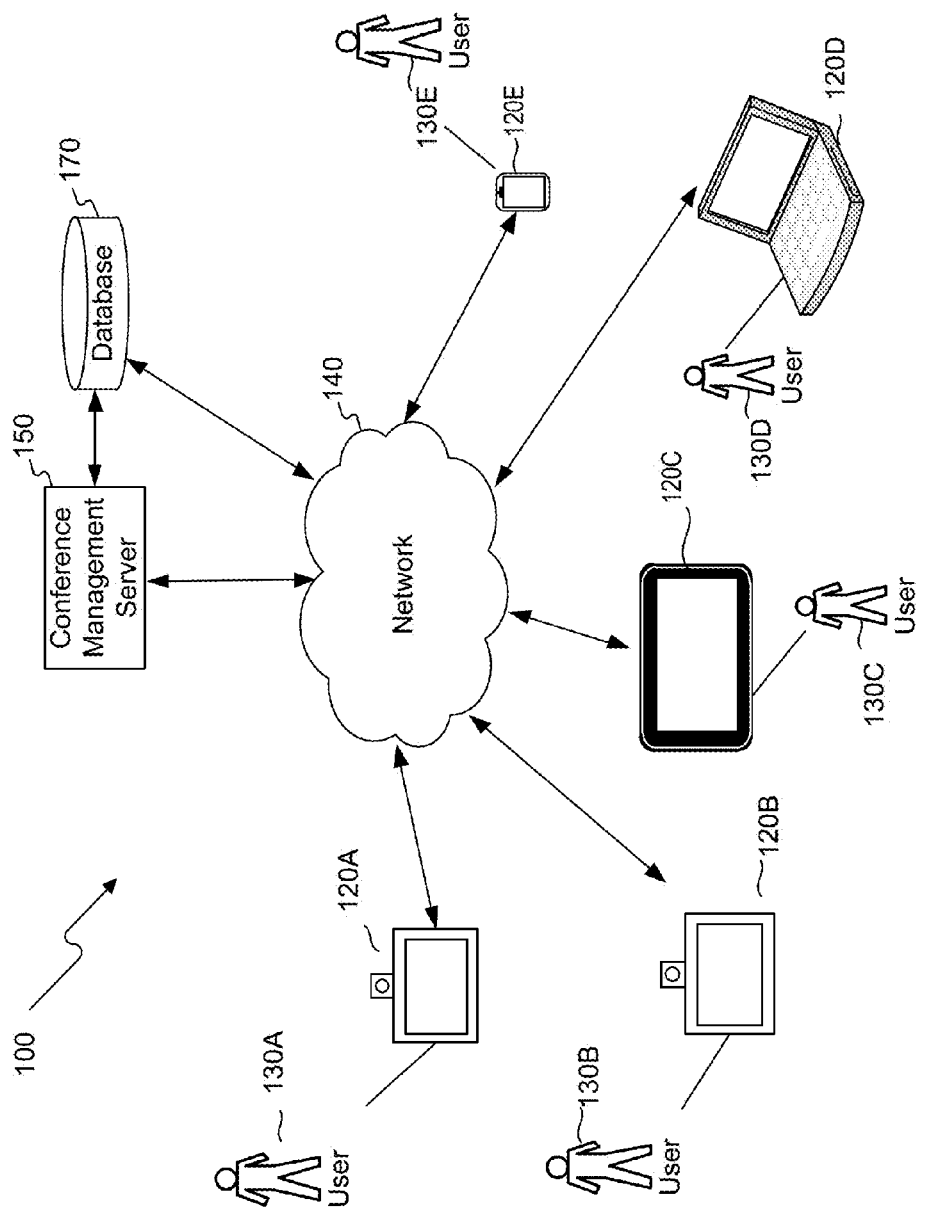
FIG. 1 is a diagram of an example conference management system in which various embodiments described herein may be practiced.

Reference will now be made in detail to the example embodiments implemented according to the present disclosure, the examples of which are illustrated in the accompanying drawings. Wherever possible, the same reference numbers will be used throughout the drawings to refer to the same or like parts.

The present disclosure arises from the need for enhanced conference management methods and systems. For example, a conference participant may wish to receive an enhanced conference notification indicating the degree of formality of the conference. As another example, before and during a teleconference, a user may wish to ensure that the cameras of the participants' devices properly capture images of the participants. Further, when a certain participant is speaking, it may be desirable to ensure that the microphone on his device is properly switched on, while the microphones associated with other participants are switched off. Furthermore, some participants in a teleconference may wish to mask or suspend the video signals showing them if they suddenly cough, or if there is some inappropriateness regarding their physical appearance.

Advantageously, embodiments of the present disclosure allow a user to schedule a conference more efficiently by providing enhanced conference notifications, which include an indication of the degree of formality of the conference such that the participants may prepare and participate accordingly. In the present disclosure, formality refers to parameters associated with the appropriateness of social demeanor or behavior in terms of, for example, physical appearance and manner of speaking. There may be various ways of categorizing degrees of formality. For example, one way may be: ceremonial, formal, semi-formal, informal, and casual, listed in a descending order of degree of formality. There may be various combinations of and modifications to the above-listed categories. Classifications and descriptions known by persons skilled in the art may be used to define different degrees of formality without departing from the scope of the present disclosure.

Further, embodiments of the present disclosure may provide the participants in teleconferences with camera adjustment notifications to ensure the cameras of the participants' devices properly capture the image(s) of the participant(s) or object(s) being displayed. Embodiments of the present disclosure further provide participants with social cues during a conference, for example, notifications indicating a deviation from appropriate social demeanor, such as inappropriateness regarding a participant's physical appearance. In addition, embodiments of the present disclosure further provide enhanced conference reminders in accordance with respective tasks to be completed by the participants.

Embodiments of the present disclosure include computer-implemented methods, tangible non-transitory computer-readable media, and systems. The computer-implemented methods can be executed, for example, by at least one processor that receives instructions from a non-transitory computer-readable storage medium. Similarly, systems consistent with the present disclosure can include at least one processor and one memory, and the memory can be a non-transitory computer-readable storage medium. As used herein, a non-transitory computer-readable storage medium refers to any type of physical memory on which information or data readable by at least one processor can be stored. Examples include random access memory (RAM), read-only memory (ROM), volatile memory, nonvolatile memory, hard drives, CD ROMs, DVDs, flash drives, disks, and any other known physical storage medium. Singular terms, such as "memory" and "computer-readable storage medium" can additionally refer to multiple structures, such as a plurality of memories or computer-readable storage mediums. As referred to herein, a "memory" can comprise any type of computer-readable storage medium unless otherwise specified. A computer-readable storage medium can store instructions for execution by at least one processor, including instructions for causing the processor to perform steps consistent with the embodiments described herein. Additionally, one or more computer-readable storage medium can be utilized in implementing a computer-implemented method. The term "computer-readable storage medium" should be understood to include tangible items and exclude carrier waves and transient signals.

FIG. 1 is a diagram of an example conference management system 100 in which various implementations as described herein may be practiced. Conference management system 100 enables a plurality of users to schedule conferences and receive notifications related to the conference. In some embodiments, one or more components of conference management system 100, such as conference management server 150, can be used to implement computer programs, applications, methods, and processes, to perform the techniques described herein.

As shown in FIG. 1, conference management system 100 includes one or more user devices 120A-120E (collectively, referred to as user devices 120), a network 140, a conference management server 150, and a database 170. The components and arrangements shown in FIG. 1 are not intended to limit the claims, as the system components used to implement the disclosed processes and features can vary.

Network 140 facilitates communication and sharing of conference-related content between user devices 120 (some or all) and conference management server 150. Network 140 may be any type of network that provides communications, exchanges information, and/or facilitates the exchange of information between conference management server 150 and user devices 120. For example, network 140 may be the Internet, a Local Area Network, a cellular network, a public switched telephone network ("PSTN"), or other suitable connection(s) that enables conference management system 100 to send and receive information between the components of conference management system 100. Network 140 may support a variety of electronic messaging formats, and may further support a variety of services and applications for user devices 120.

Conference management server 150 can be a computer-based system including computer system components, work stations, memory devices, and internal network(s) connecting these components. Conference management server 150 may be configured to provide conference services, such as setting up and managing conference sessions among users 130A-130E. Conference management server 150 may be configured to receive information from user devices 120 over network 140, process the information, store the information, and/or transmit conference-related information to user devices 120 over network 140. For example, conference management server 150 may be configured to analyze images, video signals, and audio signals sent by users 130A-130E, and analyze the received content for generating corresponding notifications to the user devices. The notifications may include conference scheduling notifications, notifications reflecting the degree of formality of the conference, and notifications regarding deviations from appropriate demeanor. The notifications may further include notifications indicating types of user devices that are better suited for a particular conference. For example, for a conference with the CEO of the company, a desktop computer may be better suited compared with other user devices associated with the same participant.

In some embodiments, the functionality of conference management server 150 described in the present disclosure can be distributed among one or more of the user devices 120A-120E. For example, one or more of the user devices 120A-120E may perform functions such as determining the degree of formality of the conference and providing related information to the conference management server, or to the other user devices.

Database 170 includes one or more physical or virtual storages coupled with conference management server 150. Database 170 can be configured to store conference information received from user devices 120, profile information of users 130, associated user device information, images of users 130, determined degrees of formality of the conferences, data used for determining degrees of formality, and data used for determining deviations from appropriate demeanor associated with different degrees of formality. Database 170 may further include images, audio signals, and video signals received from user devices 120. The data stored in database 170 may be transmitted to conference management server 150 for information analysis and notification generation. In some embodiments, database 170 is stored in a cloud-based server (not shown) that is accessible by conference management server 150 and/or the user devices 120 through network 140. While database 170 is illustrated as an external device connected to conference management server 150, database 170 may also reside within conference management server 150 as an internal component of conference management server 150.

As shown in FIG. 1, users 130A-130E may communicate with conference management server 150 using various types of user devices 120A-120E via network 140. As an example, user devices 120A, 120B, and 120D include a display such as a television, tablet, computer monitor, video conferencing console, or laptop computer screen. User devices 120A, 120B, and 120D may also include video/audio input devices such as a video camera, a web camera, a microphone or the like. As another example, user devices 120C and 120E may include mobile devices such as a tablet or a smartphone having display and video/audio capture capabilities. User devices 120A-120E may also include one or more software applications that enable the user devices to engage in communications, such as IM, text messages, email, VoIP, and video conferences, with one another.

Figure 2:
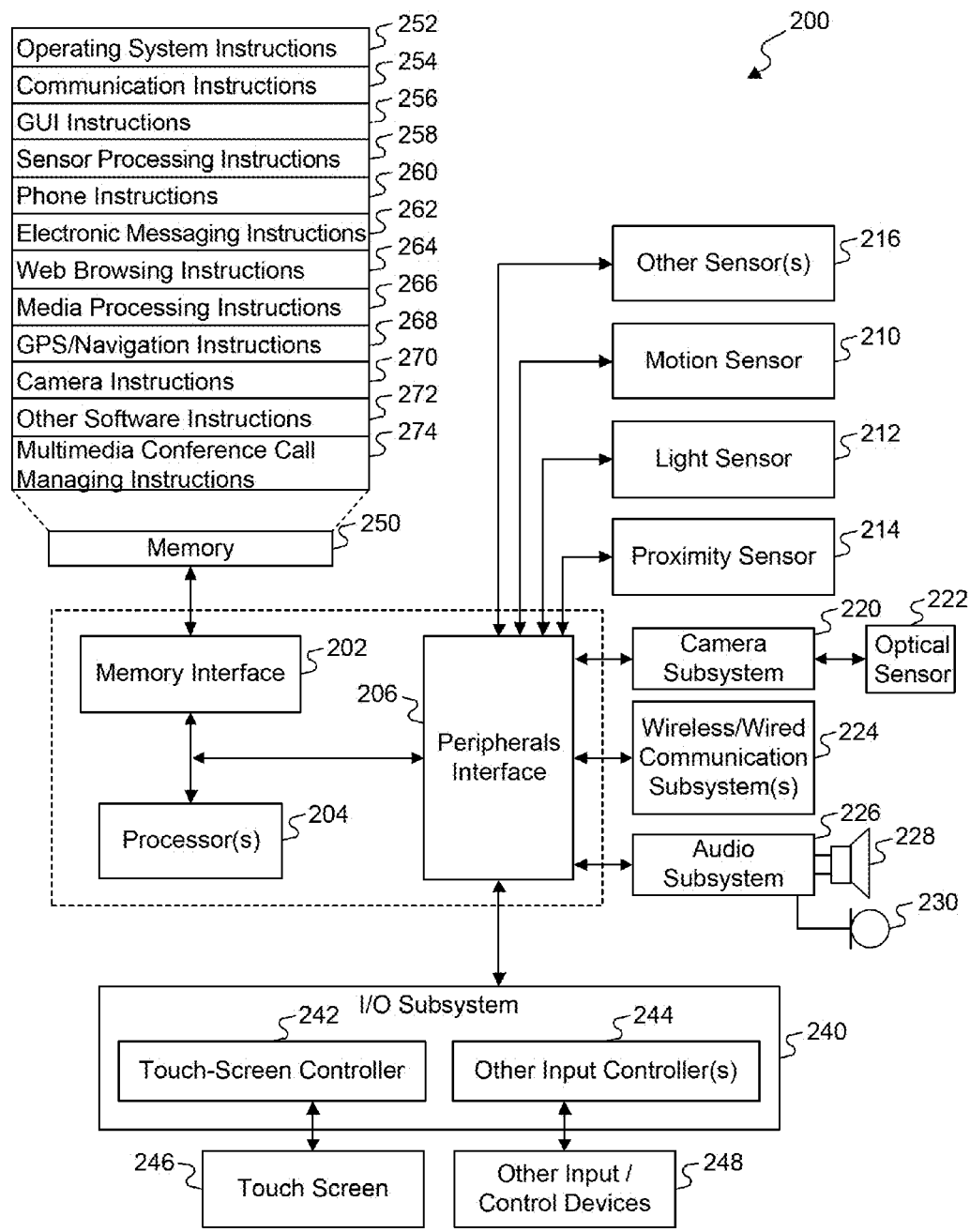
FIG. 2 is a diagram of an example user device for implementing embodiments consistent with the present disclosure.

FIG. 2 is a diagram of an example user device 200 for implementing embodiments consistent with the present disclosure. User device 200 can be used to implement computer programs, applications, methods, processes, or other software to perform embodiments described in the present disclosure. User device 200 includes a memory interface 202, one or more processors 204 such as data processors, image processors and/or central processing units, and a peripherals interface 206. Memory interface 202, one or more processor(s) 204, and/or peripherals interface 206 can be separate components or can be integrated in one or more integrated circuits. The various components in the user device 200 can be coupled by one or more communication buses or signal lines.

Sensors, devices, and subsystems can be coupled to peripherals interface 206 to facilitate multiple operations. For example, a motion sensor 210, a light sensor 212, and a proximity sensor 214 can be coupled to peripherals interface 206 to facilitate orientation, lighting, and proximity functions. Other sensors 216 can also be connected to peripherals interface 206, such as a positioning system (e.g., GPS receiver), a temperature sensor, a biometric sensor, or other sensing device, to facilitate related functionalities. A GPS receiver can be integrated with, or connected to, user device 200. For example, a GPS receiver can be built into mobile telephones, such as smartphone devices. GPS software allows mobile telephones to use an internal or external GPS receiver (e.g., connecting via a serial port or Bluetooth). A camera subsystem 220 and an optical sensor 222, e.g., a charged coupled device ("CCD") or a complementary metal-oxide semiconductor ("CMOS") optical sensor, may be utilized to facilitate camera functions, such as recording photographs and video clips.

Communication functions may be facilitated through one or more wireless/wired communication subsystems 224, which includes an Ethernet port, radio frequency receivers and transmitters and/or optical (e.g., infrared) receivers and transmitters. The specific design and implementation of wireless/wired communication subsystem 224 depends on the communication network(s) over which user device 200 is intended to operate. For example, in some embodiments, user device 200 includes wireless/wired communication subsystems 224 designed to operate over a GSM network, a GPRS network, an EDGE network, a Wi-Fi or WiMax network, and a Bluetooth® network.

An audio subsystem 226 may be coupled to a speaker 228 and a microphone 230 to facilitate voice-enabled functions, such as voice recognition, voice replication, digital recording, and telephony functions.

I/O subsystem 240 includes a touch screen controller 242 and/or other input controller(s) 244. Touch screen controller 242 is coupled to a touch screen 246. Touch screen 246 and touch screen controller 242 can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with touch screen 246. While touch screen 246 is shown in FIG. 2, I/O subsystem 240 may include a display screen (e.g., CRT or LCD) in place of touch screen 246.

Other input controller(s) 244 is coupled to other input/control devices 248, such as one or more buttons, rocker switches, thumb-wheel, infrared port, USB port, and/or a pointer device such as a stylus. Touch screen 246 can, for example, also be used to implement virtual or soft buttons and/or a keyboard.

Memory interface 202 is coupled to memory 250. Memory 250 includes high-speed random access memory and/or nonvolatile memory, such as one or more magnetic disk storage devices, one or more optical storage devices, and/or flash memory (e.g., NAND, NOR). Memory 250 stores an operating system 252, such as DARWIN, RTXC, LINUX, iOS, UNIX, OS X, WINDOWS, or an embedded operating system such as VXWorkS. Operating system 252 can include instructions for handling basic system services and for performing hardware dependent tasks. In some implementations, operating system 252 can be a kernel (e.g., UNIX kernel).

Memory 250 may also store communication instructions 254 to facilitate communicating with one or more additional devices, one or more computers and/or one or more servers. Memory 250 can include graphical user interface instructions 256 to facilitate graphic user interface processing; sensor processing instructions 258 to facilitate sensor-related processing and functions; phone instructions 260 to facilitate phone-related processes and functions; electronic messaging instructions 262 to facilitate electronic-messaging related processes and functions; web browsing instructions 264 to facilitate web browsing-related processes and functions; media processing instructions 266 to facilitate media processing-related processes and functions; GPS/navigation instructions 268 to facilitate GPS and navigation-related processes and instructions; camera instructions 270 to facilitate camera-related processes and functions; and/or other software instructions 272 to facilitate other processes and functions. Memory 250 may also include multimedia conference call managing instructions 274 to facilitate conference call related processes and instructions.

In some embodiments, communication instructions 254 represent or include software applications to facilitate connection with conference management server 150 that schedules and manages conference sessions among a plurality of users. For example, electronic messaging instructions 262 may include a software program to generate conference scheduling requests to conference management server 150 for scheduling conference sessions. Further, electronic messaging instructions 262 may include software applications to receive conference notifications from conference management server 150. Graphical user interface instructions 256 may include a software program that facilitates display of the conference notifications to a user associated with the user device and facilitates the user to provide user input, and so on.

In the presently described embodiment, the instructions may cause processor 204 to perform one or more functions of the disclosed methods. For example, the instructions may cause camera subsystem 220 to capture an image and cause the wireless communication subsystem(s) 224 to transmit the image to conference management server 150. In some embodiments, the instructions may cause processor 204 to determine a degree of formality of the conference based on conference-related information.

Each of the above identified instructions and software applications may correspond to a set of instructions for performing one or more functions described above. These instructions may be implemented as separate software programs, procedures, or modules. Memory 250 may include additional instructions or fewer instructions. Furthermore, various functions of user device 200 may be implemented in hardware and/or in software, including in one or more signal processing and/or application specific integrated circuits.

Figure 3:
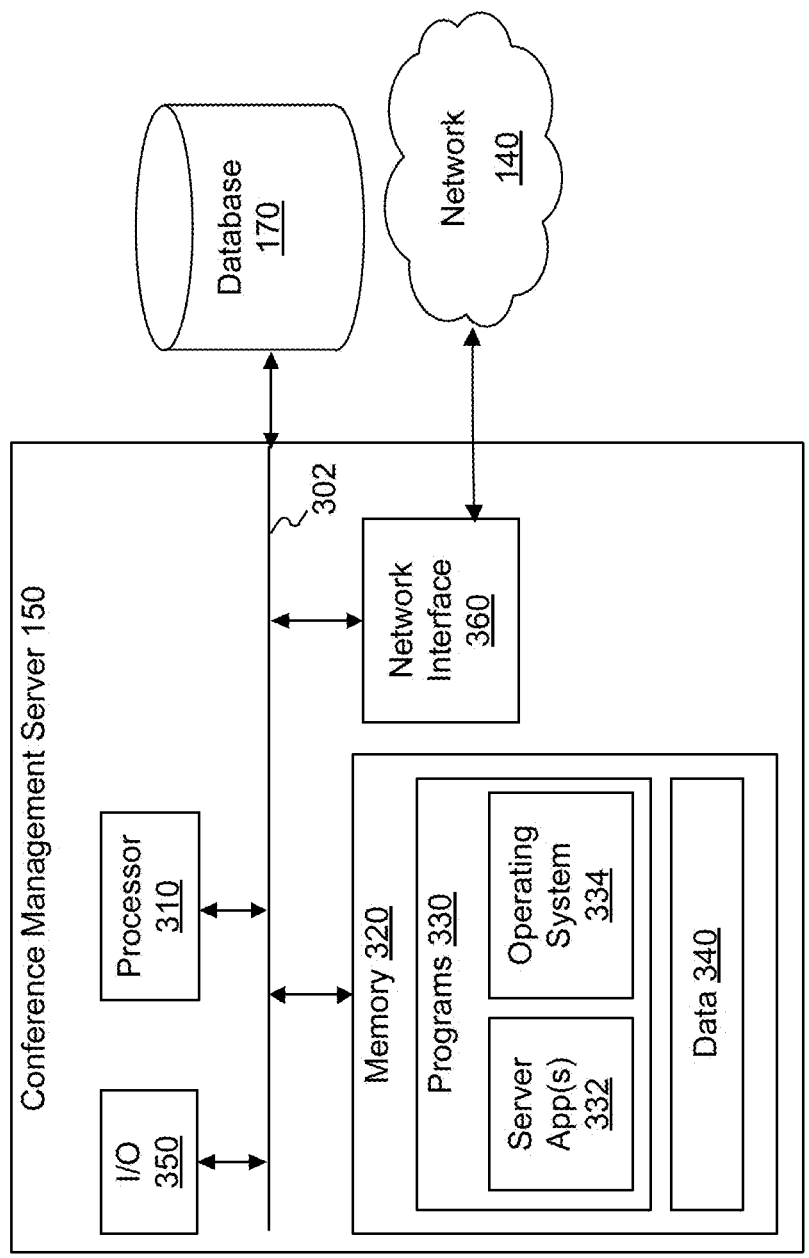
FIG. 3 is a diagram of an example conference management server, in accordance with some embodiments of the present disclosure.

FIG. 3 is a diagram of an example conference management server 150, in accordance with some embodiments of the present disclosure. Conference management server 150 includes a bus 302 (or other communication mechanism) which interconnects subsystems or components for transferring information within conference management server 150. As shown in FIG. 3, conference management server 150 includes one or more processors 310, input/output ("I/O") devices 350, network interface 360 (e.g., a modem, Ethernet card, or any other interface configured to exchange data with network 140), and one or more memories 320 storing programs 330 including, for example, server app(s) 332, operating system 334, and data 340, and can communicate with an external database 170 (which, for some embodiments, may be included within conference management server 150). Conference management server 150 may be a single server or may be configured as a distributed computer system including multiple servers, server farms, clouds, or computers that interoperate to perform one or more of the processes and functionalities associated with the disclosed embodiments.

Processor 310 may be one or more processing devices configured to perform functions of the disclosed methods, such as a microprocessor manufactured by Intel™ or AMD™. Processor 310 may comprise a single core or multiple core processors executing parallel processes simultaneously. For example, processor 310 may be a single core processor configured with virtual processing technologies. In some embodiments, processor 310 may use logical processors to simultaneously execute and control multiple processes. Processor 310 may implement virtual machine technologies, or other technologies to provide the ability to execute, control, run, manipulate, store, etc., multiple software processes, applications, programs, etc. In some embodiments, processor 310 may include a multiple-core processor arrangement (e.g., dual, quad core, etc.) configured to provide parallel processing functionalities to allow conference management server 150 to execute multiple processes simultaneously. It is appreciated that other types of processor arrangements could be implemented that provide for the capabilities disclosed herein.

Memory 320 may be a volatile or nonvolatile, magnetic, semiconductor, tape, optical, removable, non-removable, or other type of storage device or tangible or non-transitory computer-readable medium that stores one or more program(s) 330 such as server apps 332 and operating system 334, and data 340. Common forms of non-transitory media include, for example, a flash drive, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM or any other flash memory, NVRAM, a cache, a register, any other memory chip or cartridge, and networked versions of the same.

Conference management server 150 may include one or more storage devices configured to store information used by processor 310 (or other components) to perform certain functions related to the disclosed embodiments. For example, conference management server 150 may include memory 320 that includes instructions to enable processor 310 to execute one or more applications, such as server apps 332, operating system 334, and any other type of application or software known to be available on computer systems. Alternatively or additionally, the instructions, application programs, etc., may be stored in an external database 170 (which can also be internal to conference management server 150) or external storage communicatively coupled with conference management server 150 (not shown), such as one or more databases or memories accessible over network 140.

Database 170 or other external storage may be a volatile or nonvolatile, magnetic, semiconductor, tape, optical, removable, non-removable, or other type of storage device or tangible or non-transitory computer-readable medium. Memory 320 and database 170 may include one or more memory devices that store data and instructions used to perform one or more features of the disclosed embodiments. Memory 320 and database 170 may also include any combination of one or more databases controlled by memory controller devices (e.g., server(s), etc.) or software, such as document management systems, Microsoft SQL databases, SharePoint databases, Oracle™ databases, Sybase™ databases, or other relational databases.

In some embodiments, conference management server 150 may be communicatively coupled to one or more remote memory devices (e.g., remote databases (not shown)) through network 140 or a different network. The remote memory devices can be configured to store information that conference management server 150 can access and/or manage. By way of example, the remote memory devices could be document management systems, Microsoft SQL database, SharePoint databases, Oracle™ databases, Sybase™ databases, or other relational databases. Systems and methods consistent with the disclosed embodiments, however, are not limited to separate databases or even to the use of a database.

Programs 330 include one or more software modules configured to cause processor 310 to perform one or more functions consistent with the disclosed embodiments. Moreover, processor 310 may execute one or more programs located remotely from one or more components of conference management system 100. For example, conference management server 150 may access one or more remote programs that, when executed, perform functions related to disclosed embodiments.

In the presently described embodiment, server app(s) 332 causes processor 310 to perform one or more functions of the disclosed methods. For example, server app(s) 332 may cause processor 310 to receive conference information, such as conference scheduling requests sent by one or more users; determine, based on the received conference information, a degree of formality of the conference; and send conference-related notifications to one or more user devices. In some embodiments, other components of conference management system 100 may be configured to perform one or more functions of the disclosed methods. For example, user devices 120A-120E may be configured to determine a degree of formality for the conference based on conference-related information.

Programs 330 further include operating system 334 performing operating system functions when executed by one or more processors such as processor 310. By way of example, operating system 334 may include Microsoft Windows™, Unix™, Linux™, Apple™ operating systems, Personal Digital Assistant (PDA) type operating systems, such as Apple iOS, Google Android, Blackberry OS, or other types of operating systems. Accordingly, disclosed embodiments may operate and function with computer systems running any type of operating system 334. Conference management server 150 may also include software that, when executed by a processor, provides communications with network 140 through network interface 360 and/or a direct connection to one or more user devices 120A-120E.

In some embodiments, data 340 may include conference information received from user devices 120, profiles of users 130 such as their contact information, associated device information, and images of users 130. Data 340 may further include data used for determining a degree of formality of the conference and data used for determining deviations from appropriate demeanor corresponding to a degree of formality. For example, data 340 may include data corresponding to different degrees of formality, such as events information, dress code information, participants' information, venue information, and conference subjects or themes. Further, data 340 may include (i) data used for analyzing and determining parameters associated with a participant's manner of speaking, such as speaking rate, speaking tone, and utterance content, and (ii) data used for determining behavior of a user, such as facial expressions and body gestures, which may be discerned from a user speaking, coughing, or sneezing.

Conference management server 150 may also include one or more I/O devices 350 having one or more interfaces for receiving signals or input from devices and providing signals or output to one or more devices that allow data to be received and/or transmitted by conference management server 150. For example, conference management server 150 may include interface components for interfacing with one or more input devices, such as one or more keyboards, mouse devices, and the like, that enable conference management server 150 to receive input from an operator or administrator (not shown).

Figure 4:
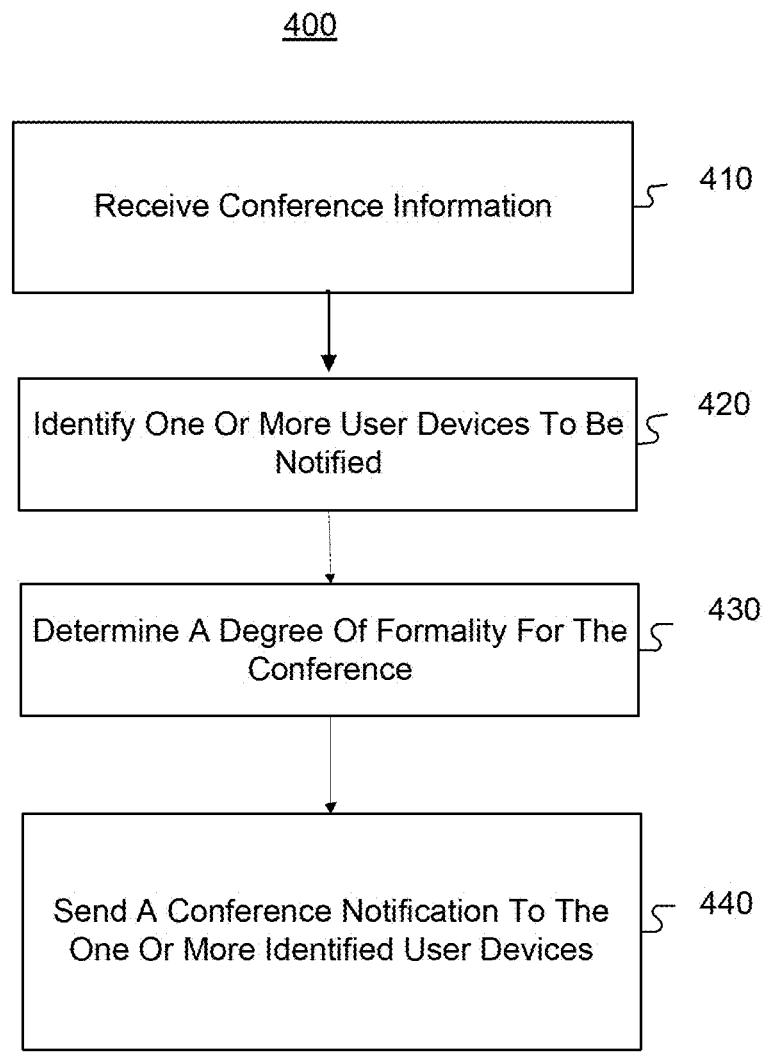
FIG. 4 is a flowchart of an example process for providing an enhanced conference notification, in accordance with some embodiments of the present disclosure.

FIG. 4 is a flowchart of an example process 400 for enhanced conference management, in accordance with some embodiments of the present disclosure. In some embodiments, the steps associated with this example process may be performed by, for example, a processor 310 of conference management server 150 as shown in FIG. 3. In some embodiments, some steps of the example process 400, such as the determination of a degree of formality of the conference, may also be performed by one or more of user devices 120, which may then transmit information reflecting the determined degree of formality to conference management server 150, or other user devices.

In step 410, conference management server 150 receives conference information, for example, from a user device. The conference information may include a conference subject and an identification of at least one participant. The conference information may be included in an email, an attachment to an email, or a document in word, PDF, JPEG, or various other formats. Other methods known by persons skilled in the art may be used to transmit the conference information from the user device without departing from the scope of the present disclosure.

In some embodiments, the conference information may include information regarding conference subjects, such as discussion of a business plan or networking event, consultation regarding a legal matter, presentation by a certain speaker, dialogue between certain members of the company or the community, celebration of an event, or project planning. Different subjects may correspond to different degrees of formality. For example, a business development conference involving potential business partners may be a formal event requiring participants to dress formally and speak in a more formal tone.

In some embodiments, the conference information may include identification information of one or more participant(s). For example, the conference information may list the chief marketing counsel as one participant, staff members of the legal or technology department of an entity, an outside counsel, or an expert invited to present on certain subjects.

In some embodiments, the conference information may further include venue information, conference date and time, directions to the venue, and detailed conference agenda. Further, as discussed with reference to FIG. 9, the conference information may include information regarding one or more tasks to be completed by certain participants or conference assistance needed from non-participants. In some embodiments, the conference information may be updated after conference management server 150 sends out an initial conference notification. Conference information updates may be sent from one or more of the user devices. Conference management server 150 may further send corresponding notifications to the user devices.

In step 420, conference management server 150 identifies, based on the received conference information, one or more user devices to be notified. User devices may include user devices associated with participants of the conference and user devices associated with non-participants that may be involved in the preparation for the conference. For example, conference management server 150 may identify participant-related information included in the conference information and locate corresponding device information from a directory or a database storing user profiles, such as database 170 as shown in FIG. 1. Other methods known by persons skilled in the art may be used to identify user devices to be notified based on the received conference information without departing from the scope of the present disclosure.

In some embodiments, the identified user devices may include user devices associated with non-participants. For example, the conference information may indicate potential assistance needed from certain non-participants, such as assistance from staff members in the Information Technology (IT) department for setting up conference equipment or assistance from staff members in the service departments for venue preparation or catering service. Conference management server 150 may identify the corresponding user devices of the responsible staff members and send notifications accordingly, as further described below with reference to FIG. 9.

In step 430, the conference management server determines, based on the received conference information, a degree of formality for the conference. As noted above, formality used herein may refer to parameters associated with the appropriateness of social behavior or demeanor. There may be various ways of categorizing degrees of formality. For example, one common way of classifying degrees of formality may be: ceremonial, formal, semi-formal, informal, and casual. Different degrees of formality may correspond to different appropriate social behavior, for example, different types of physical appearance and manners of speaking. For example, determining and notifying participants of the degree of formality of a conference may assist participants to prepare for and participate in the conference accordingly. As an example, if a participant receives a notification indicating that a conference is "formal," the participant may accordingly prepare formal business wear and be aware that speaking at the conference may require a more formal tone.

Conference management server 150 may determine a degree of formality of the conference based on various types of information included in the conference information received in step 410. In some embodiments, conference management server 150 may determine a degree of formality based on the conference subject information. Different categories of conference subjects, such as business development, legal proceeding, training sessions, lectures, weddings, or social networking events, may correspond to different degrees of formality. For example, if the conference subject indicates a negotiation session with business partners, conference management server 150 may determine that the degree of formality of the conference is "formal." As another example, if the conference information indicates the conference is an educational presentation for all levels of employees in the company, conference management server 150 may determine that the degree of formality is "semi-formal" or "informal." In some embodiments, conference management server 150 may analyze the conference subject information using a database storing a correspondence relationship between subjects/themes and degrees of formality to determine the degree of formality of a particular conference.

In some embodiments, conference management server 150 may determine a degree of formality of the conference based on the identification of conference participants. For example, if the conference information indicates the CEO of the company is attending the conference, conference management server 150 may determine the degree of formality of the conference is "formal." In some embodiments, conference management server 150 may determine the degree of formality of the conference based on the dress code information included in the conference information. For example, if the conference information includes dress codes for the conference, for example, business casual or black tie, conference management server 150 may access a database storing dress code information associated with different degrees of formality to determine a corresponding degree of formality.

In some embodiments, conference management server 150 may determine a degree of formality based on the venue information of the conference. For example, if the conference information indicates a session taking place in a courtroom where a greater degree of formality is necessary, conference management server 150 may determine the degree of formality as "formal" or "business formal." Conference management server 150 may refer to data indicating a correspondence relationship between different venues and different degrees of formality in making the determination. Further, in some embodiments, conference management server 150 may determine degrees of formality based on information exchanged between the participants, for example, documents uploaded by the participants to a shared communication forum. These documents may provide information relating to the issues or subjects to be addressed at the conference.

In some embodiments, after determining the degree of formality of the conference, conference management server 150 may store the determined degree of formality in a database or memory. Conference management server 150 may further refer to the determined degree of formality when monitoring the behavior or demeanor of the participants during the conference, as further described below. In some embodiments, conference management server 150 may store the determined degree of formality in a database corresponding to the conference information for purposes such as record keeping and future references. Further, the determined degrees of formality for various conferences may further be used for self-learning to optimize the determination process. For example, accumulated determination results regarding a plurality of conferences within a certain organization may be fed back as acquired training data to optimize machine learning algorithms associated with the determination process.

In step 440, conference management server 150 sends a conference notification to the one or more user devices identified in step 420. The conference notification may include information reflecting the degree of formality. In some embodiments, the information reflecting the degree of formality may be represented simply by, for example, "ceremonial", "formal", "semi-formal", or "causal".

In some embodiments, the conference notification may further include details regarding appropriate behavior or demeanor corresponding to the determined degree of formality, for example, appropriate physical appearance (e.g., types and tidiness of attire) and/or an appropriate manner of speaking (e.g., a speaking tone, a range of speaking rates, or languages). For example, the conference notification may include information indicating a proper dress code for the conference based on the determined degree of formality. Different degrees of formality may correspond to different dress codes/types of attire. For example, if the determined degree of formality is "formal," the conference notification may include information indicating formal attire.

The conference notification may include detailed information indicating a proper speaking tone or a proper speaking rate for the conference. Speaking tone may refer to the way a conference participant expresses himself. For example, speaking tones may include technical, conversational, formal, and informal. For a formal conference, the conference notification may indicate that a proper speaking tone at the conference is "formal."

Speaking rate may refer to the speed at which a conference participant speaks. Speaking rate may be measured by the number of words per minute (wpm) that are spoken. Speaking rate alters depending on cultural habits, gender, occasion, subject matters, the speaker's emotional state, or the audience. For example, speakers of a causal conversation may speak at a rate of 130 wpm, up to 200 wpm, while auctioneers or sports commentators may be required to speak at a rate of 300 wpm or ever higher. In some embodiments, speaking rates may be referred to as, for example, "slow," "fast," or "normal." Conference management server 150 may include in the conference notification information indicating a proper speaking rate for the conference. For example, if a participant is giving a presentation on new technologies to senior staff members of a certain department, the conference notification may include information suggesting a speaking rate of no more than 120 wpm, or "slow."

In some embodiments, conference management server 150 may, based on the conference information, determine that a certain language would be proper for the attending audience. For example, Spanish may be determined as a proper speaking language for a conference with a Spanish-speaking audience. The conference notification may further include information indicating a proper language type for the entirety or a certain portion of the conference.

In some embodiments, the conference notification may further include information indicating that one or more user devices are better suited for a conference compared with other devices associated with a same participant. For example, for a conference with the CEO of the company, the conference notification may include an indication that a desktop computer is better suited for the conference compared with a mobile phone or a tablet associated with the same participant. In some embodiments, conference management server 150 may send similar notifications during the conference. For example, if the device used by a participant to log in to a conference forum is not best suited for the conference, conference management server 150 may send a notification indicating a suggested device associated with the participant.

In some embodiments, the conference notification may further include other relevant conference information, such as an agenda, a list of participants, venue information, conference date and time, and tasks to be completed by certain participants. Further, conference management server 150 may send one or more subsequent notifications after a conference has begun. For example, where conference information updates are received from the user devices, conference management server 150 may provide additional conference information such as new participants, new topics, or schedule updates.

The conference notification may be in different formats, such as an email, a text massage, or an image. Various methods and formats known by persons skilled in the art may be used to send conference notifications to the user devices without departing from the scope of the present disclosure.

Figure 5:
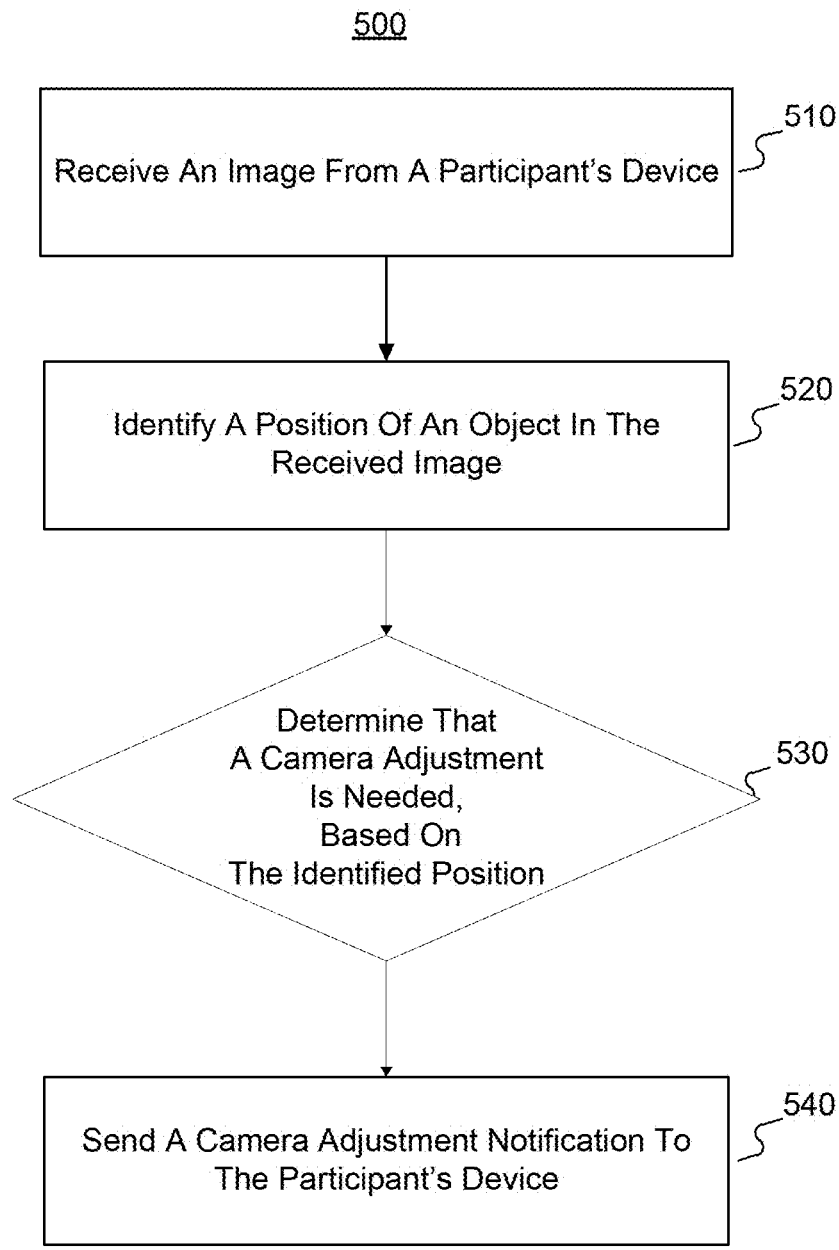
FIG. 5 is a flowchart of an example process for providing a camera adjustment notification, in accordance with some embodiments of the present disclosure.

FIG. 5 is a flowchart of an example process 500 for providing a camera adjustment notification during a teleconferencing session, in accordance with some embodiments of the present disclosure. The steps associated with this example process may be performed by, for example, a processor 310 of conference management server 150 as shown in FIG. 3. In some embodiments, prior to or during a video conference, conference management server 150 may send camera adjustment notifications to the user devices associated with the participants, suggesting necessary camera adjustments. The participants may adjust their cameras accordingly to ensure images are properly captured.

In step 510, conference management server 150 receives an image from a participant's device, for example, an image captured by a camera associated with the participant's device. In some embodiments, conference management server 150 may receive a plurality of images, and the images may further include image frames extracted from video signals received from the participant's device or pictures captured and transmitted from the participant's device.

In step 520, conference management server 150 identifies a position of an object in the received image. For example, conference management server 150 may utilize various video and image processing techniques to recognize different objects in the image. In some embodiments, conference management server 150 may use edge detection technologies to detect the edges of an object, such as the participant's face or an item displayed. For example, in cases where the images are image frames extracted from video signals, conference management server 150 may identify the difference between the frames to distinguish background objects from the object(s) to be displayed. Conference management server 150 may then identify a position of a to-be-displayed object through edge detection.

In step 530, conference management server 150 determines whether a camera adjustment is needed based on the identified position of the object. In some embodiments, conference management server 150 may compare the parameters of the identified position with a set of predetermined parameters. For example, in a video conference, it may be desirable for each participant to be displayed in the center of the image captured and it may desirable that the face of the participant is of a certain size relative to the image. Such parameters may be predetermined and stored in a database, which conference management server 150 may access in making camera adjustment determinations. If the identified position does not satisfy the predetermined parameters, conference management server 150 may determine that camera adjustments are necessary. For example, if the identified position of the participant's face is on the left side of the image, or a portion of the participant's face is not captured, conference management server 150 may determine that camera adjustments are needed.

In step 540, in response to a determination that a camera adjustment is needed, conference management server 150 may send a camera adjustment notification to the corresponding participant's device. The camera adjustment notification may be in different formats and may include information indicating suggested adjustments. For example, the camera adjustment notification may be a message including instructions such as "please tilt your camera to the right for better viewing" or "please remove objects blocking your camera." In some embodiments, conference management server 150 may send the camera adjustment notification in a machine understandable form that can be interpreted and acted upon automatically by the participant's device in order to adjust the camera without the need for involvement by the participant. For example, if an image received from the participant's device showing the participant's face or an object upside down, conference management server 150 may send a camera adjustment notification to the participant's device to automatically rotate the image or adjust camera orientation without the need for operations by the participant.

In some embodiments, after a camera adjustment is made to the participant's device, conference management server 150 may receive subsequent images from the participant's device. Conference management server 150 may then repeat steps 520-540, and send subsequent camera adjustment notifications to the participants' device. For example, a camera of a participant's device may be switched from capturing the participant's face to capturing a certain item. Conference management server 150 may identify a position of the item in the received image and send corresponding camera adjustment notifications to ensure that the item is properly shown. Similarly, conference management server 150 may repeat the process, if the camera is subsequently switched back to capturing the participants' face.

In some embodiments, conference management server 150 may monitor the quality of the images transmitted from the participants' devices. For example, conference management server 150 may analyze the images received, and determine a set of image quality parameters, such as sharpness, noise, contrast, color accuracy, and exposure accuracy. Conference management server 150 may compare these parameters with predetermined thresholds. If the determined parameters do not satisfy the predetermined thresholds, conference management server 150 may use a pre-stored profile photo of a participant for display instead of real-time images transmitted from the participant's device. For example, if during the conference a participant moves into a place where a lack of light affects the quality of the image captured, conference management server 150 may temporarily provide a pre-stored profile photo of the participant for display on the other participants' devices.

Figure 6A:
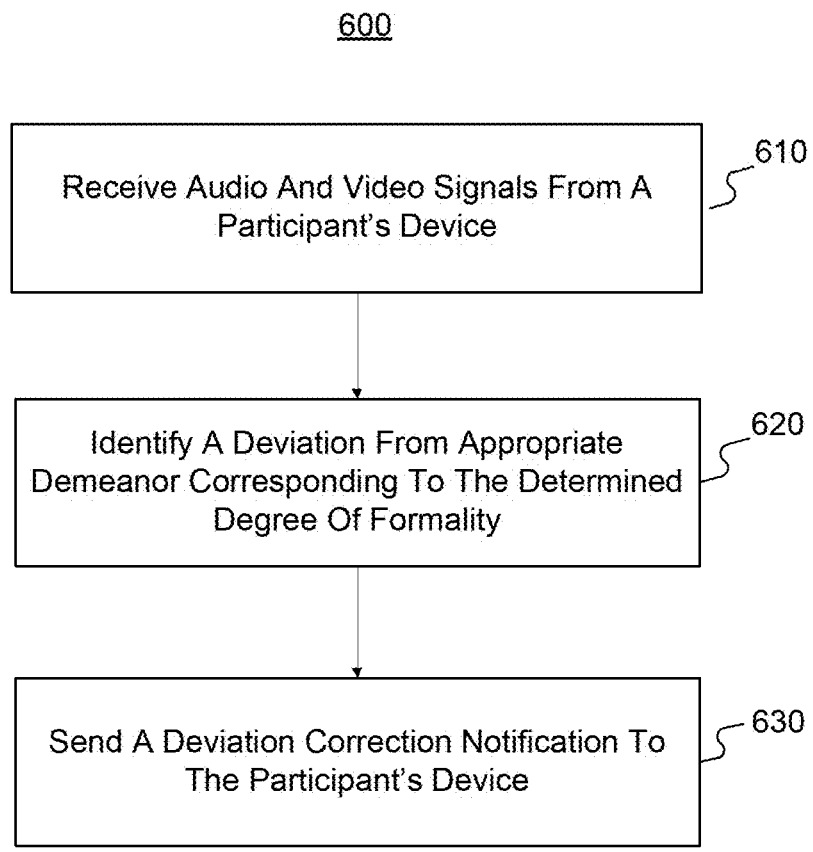
FIG. 6A is a flowchart of an example process for providing a demeanor deviation notification, in accordance with some embodiments of the present disclosure.

FIG. 6A is a flowchart of an example process 600 for providing a behavior or demeanor deviation notification, in accordance with some embodiments of the present disclosure. The steps associated with this example process may be performed by, for example, a processor 310 of conference management server 150 as shown in FIG. 3. In some embodiments, conference management server 150 may monitor the conference, and provide social cues to participants regarding their social demeanor. For example, conference management server 150 may send notifications to participants regarding inappropriate social demeanors that deviate from the determined degree of formality.

In step 610, conference management server 150 receives audio and video signals from a participant's device, for example, in order to record and monitor the conference. The audio and video signals may be captured by camera and microphone components of the participants' devices and transmitted to conference management server 150, as described above with reference to FIGS. 1 and 2.

In step 620, conference management server 150 identifies, based on the received signals, a deviation from appropriate social demeanor. For example, a deviation may refer to inappropriateness regarding a participant's physical appearance, or a manner of speaking that does not conform to the determined degree of formality.

In some embodiments, conference management server 150 may access a database storing a relationship between different degrees of formality and corresponding social demeanor. With respect to physical appearance, different dress codes or hair styles may be appropriate for conferences of different degrees of formality. For example, for female participants, a loose pony tail or a loose bun may be appropriate for a casual online chat with friends, but such a hair style may not be appropriate for a formal conference with a government official. As another example, a shirt with noticeable food stains may not be appropriate for a formal business conference or even a casual conference.

In some embodiments, conference management server 150 may identify a deviation from appropriate physical appearance by: identifying features of physical appearance of a participant by analyzing images received from the participant's device; comparing the identified features with data representing appropriate physical appearance corresponding to the determined degree of formality; and determining whether there is a deviation based on the comparison.

For example, conference management server 150 may use various video and image processing techniques to extract features regarding the participant's physical appearance, for example, hair style, type of clothing, and characteristics of clothing. Types of clothing may refer to different styles of dresses, ties, different types of shirts (e.g., sleeveless, short sleeve, and long sleeve), scarfs, and so on. Characteristics of clothing may include the color, pattern, and tidiness of clothing, such as noticeable food or drink stains on a piece of clothing. In some embodiments, conference management server 150 may identify the participant's hair style by, for example, comparing features of the participant's hair with data representing various hair styles.

Conference management server 150 may then determine whether the identified hair style and types and characteristics of clothing are appropriate for the conference. For example, in making the determination, conference management server 150 may access a database storing appropriate physical appearance information (e.g., hair style, and types and characteristics of clothing) corresponding to a determined degree of formality of the conference.

Similarly, with respect to the participant's manner of speaking, conference management server 150 may analyze the received audio signals to determine whether there is deviation from an appropriate manner of speaking. Various speech and language analysis techniques may be used to analyze the features of the participant's speech. For example, conference management server 150 may determine a speaking rate of a participant based on the audio signals transmitted from the participant's device and determine whether the speaking rate is within a proper range. For example, if a participant is addressing business partners at a formal conference, the proper speaking rate may not exceed 200 wpm. If the participant is speaking at a rate higher than 200 wpm, conference management server 150 may determine there is a deviation from the proper speaking rate. As another example, conference management server 150 may track the speech of a participant and determine the participant's tone of speaking, using speaking tone analysis techniques. If the determined degree of formality of the conference is "formal" but the participant is speaking in a very casual tone, conference management server 150 may determine there is a deviation from a proper speaking tone.

In some embodiments, conference management server 150 may recognize that the participant is about to sneeze or cough, which may be an inappropriate utterance in front of a conference audience, and may thus be considered as a deviation from appropriate demeanor. For example, conference management server 150 may extract features from the received video and audio signals and compare the features with pre-stored data representing facial expressions, utterances, and body gestures that are known to immediately precede coughing or sneezing. If the extracted features are consistent with the pre-stored data, conference management server 150 may determine that the participant is about to cough or sneeze. In some embodiments, conference management server 150 may then temporarily suspend the display of the participant and/or mute the microphone of the participant's device, as further described below.

In step 630, conference management server 150 may send, based on the identified deviation, a deviation correction notification to the participant's device. For example, if in step 620, the determined deviation is the participant not wearing a tie or not wearing a tie properly, which is considered inappropriate for a formal conference, conference management server 150 may send a deviation correction notification to the participant's device indicating necessary correction, such as "please fix your tie." In some embodiments, conference management server 150 may simulate appropriate clothing for the participant. For example, conference management server 150 may provide a simulation feature through a user interface allowing the participant to choose a virtual outfit (such as a formal dress or shirt) that corresponds to appropriate physical appearance for the conference, and use integrated graphics technology to generate images of the participant with the virtual outfit for display.

Further, if in step 620, the determined deviation indicates a participant is speaking at a rate higher than a normal conversational rate, conference management server 150 may send a deviation correction notification indicating necessary adjustments such as "please speak more slowly." In some embodiments, conference management server 150 may record the audio signals received from a participant's device and automatically adjust the playback speed, for example, to slow down or speed up to an appropriate rate when transmitting the audio signals to the other participants' device.

In some embodiments, the deviation correction notifications may include pre-formatted messages stored in a database, for example, database 170 as shown in FIG. 1. The pre-formatted messages may include a plurality of messages associated with various types of deviations. Conference management server 150 may, upon identifying a certain deviation, access the database and transmit a corresponding message to the participant's device.

In some embodiments, the deviation correction notification may include selection icons allowing a participant to perform certain operations. For example, a deviation correction notification may indicate a participant should remove a stain on his shirt. The deviation correction notification may further include, for example, a selection button to switch from a real-time display of the participant to a pre-stored profile photo, or a selection button allowing the participant to temporarily exit from the conference. In some embodiments, conference management server 150 may, automatically or upon user operations, edit the images/videos received from the participant's device and provide images/audios with the detected stain removed for display on the other participants' device.

In some embodiments, conference management server 150 may provide deviation mitigation assistance such as limiting a display size of the participant, masking display of the participant, temporarily muting the participant's microphone, or turning off the participant's camera until a deviation is corrected. For example, if conference management server 150 determines that a participant is about to sneeze or cough, conference management server 150 may suspend real-time display of the participant or use a pre-stored profile photo of the participant. In some embodiments, conference management server 150 may temporarily mute a microphone of the participant's device when the participant is sneezing or coughing. Further, conference management server 150 may subsequently send a notification to the participant's device regarding the operation.

In some embodiments, conference management server 150 may provide deviation mitigation assistance based on an estimate duration or seriousness of the deviation. For example, if the deviation is minor or transient (e.g., the participant may quickly adjust his hair or tie), conference management server 150 may temporarily decrease/limit a display size of the participant until adjustment is made to correct the deviation. This way the participant may remain viewable by the other participants. As another example, if the deviation is severe or cannot be corrected within a short time (e.g., the participant is not dressed formally), conference management server 150 may mask the display of the participant or use a pre-stored profile photo instead of real-time images.

In some embodiments, conference management server 150 may provide different levels of deviation mitigation assistance based on whether the deviation is timely and properly corrected. For example, after a deviation correction notification regarding the participant's physical appearance is sent to the participant's device, conference management server 150 may temporarily limit the display size of the participant, and if the deviation persists or is not addressed properly within a pre-set time, conference management server 150 may proceed with higher-level assistance such as masking the display of the participant or turning off the camera of the participant's device.

In some embodiments, some of the steps described in example process 600 may be implemented by a user device associated with a participant, such as one of user devices 120 of FIG. 1. For example, one or more of user devices 120A-120E may perform functions such as determining a deviation from appropriate physical appearance, for example, by analyzing images captured by a camera of the user device. The user device may then provide and display a corresponding deviation correction notification on a display of the user device.

Figure 6B:
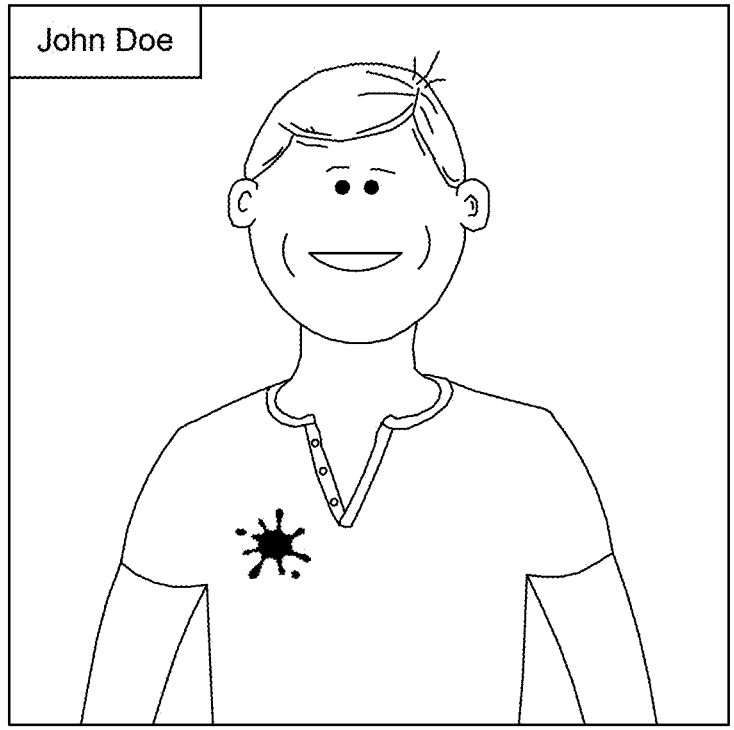
FIG. 6B is a diagram of an example image for identifying a physical appearance deviation, in accordance with some embodiments of the present disclosure.

FIG. 6B is a diagram of an example image for identifying a physical appearance deviation, in accordance with some embodiments of the present disclosure. As shown in FIG. 6B, an image of a conference participant John Doe is received from the user device of John Doe. Conference management server 150 may analyze the image and extract features regarding John Doe's physical appearance, such as his hair style, type of clothing, and characteristics of clothing. Conference management server 150 may identify that John Doe is not wearing a tie, he is wearing a short-sleeve shirt, and that there is a coffee stain on his shirt. Assuming that conference management server 150 determines, in example process 400, that the degree of formality of the conference is "business formal", conference management server 150 may then determine, in step 620, that there are deviations from appropriate physical appearance corresponding to "business formal." In this example, conference management server 150 may determine that there are the following deviations: no tie, short-sleeve shirt, and coffee stain.

Figure 10:
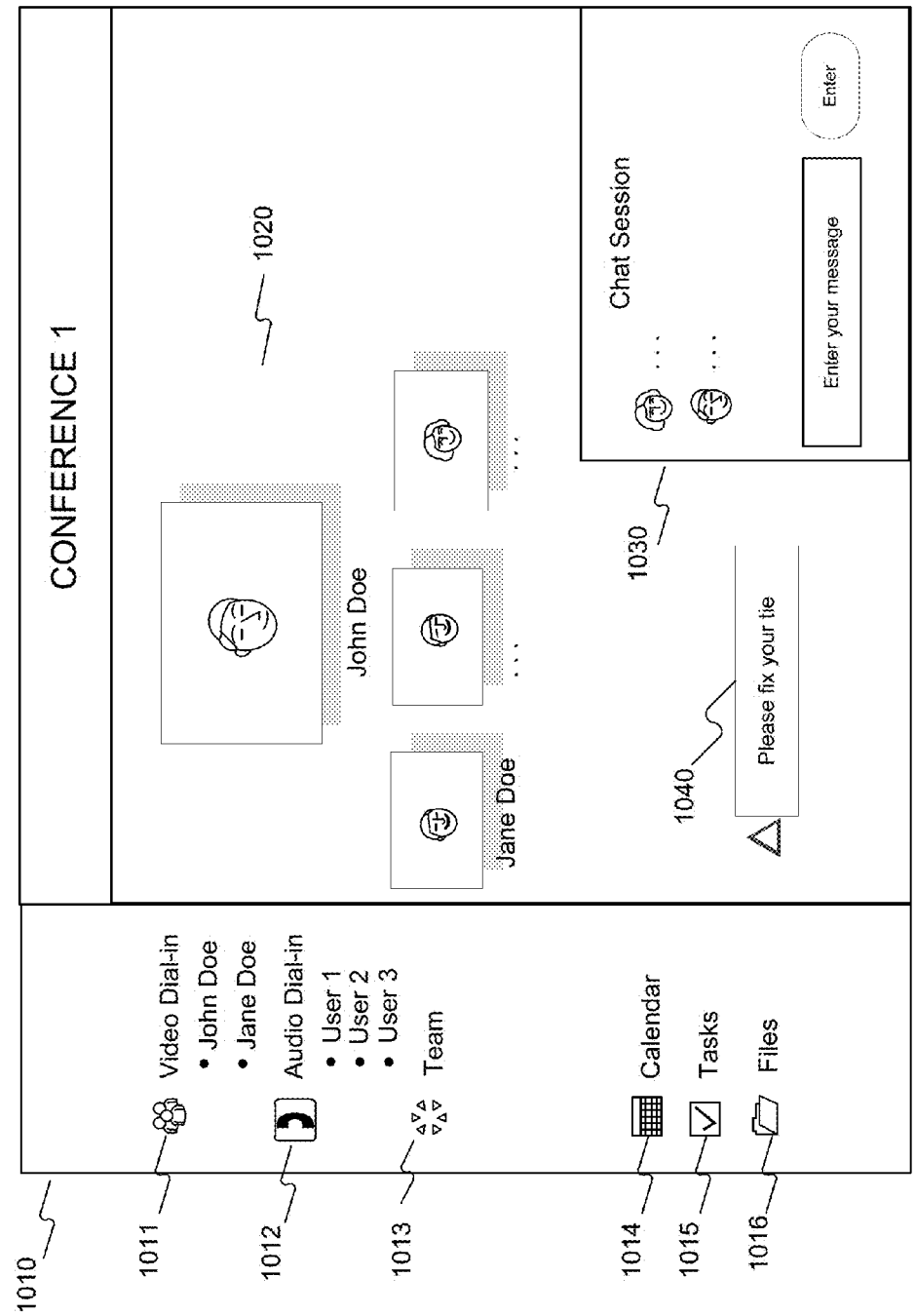
FIG. 10 is a diagram of an example teleconferencing user interface, in accordance with some embodiments of the present disclosure.

Based on the determined deviations, conference management server 150 may send one or more notifications to the user device of John Doe, indicating that correction is needed. For example, as shown in FIG. 10, a deviation correction notification message may be displayed on a display of John Doe's device that states "please fix your tie." In some embodiments, the notification message may be in different formats, and may be displayed in different positions of the user interface.

Figure 7:
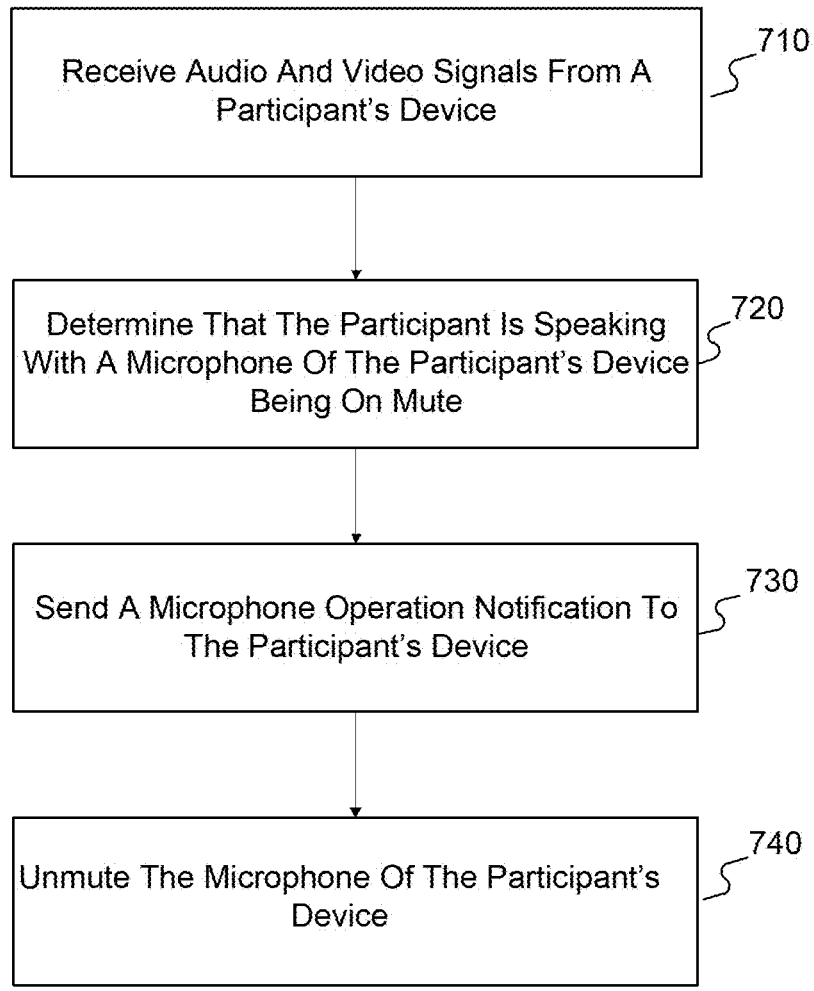
FIG. 7 is a flowchart of an example process for providing a microphone operation notification, in accordance with some embodiments of the present disclosure.

FIG. 7 is a flowchart of an example process 700 for providing a microphone operation notification, in accordance with some embodiments of the present disclosure. The steps associated with this example process may be performed by, for example, a processor 310 of conference management server 150 as shown in FIG. 3.

In step 710, conference management server 150 receives audio and video signals from a participant's device. In step 720, based on the received signals, conference management server 150 may determine that the participant is speaking with a microphone associated with the participant's device being on mute. For example, if features extracted from the received video signals indicate the participant is speaking, based on movements of speaking organs or body gestures, while no audio signals are received from the participant's device, conference management server 150 may determine that the microphone of the participant's device is on mute.

In step 730, in response to the determination, conference management server 150 may send a microphone operation notification to the participant's device requesting the participant to unmute the microphone. In step 740, conference management server 150 may further perform operations to unmute the microphone of the participant's device. For example, the notification sent to the participant's device may further include an operation button for unmuting the microphone. Selection of the button by the participant may accordingly unmute the microphone, or instruct conference management server 150 to perform remote operations to unmute the microphone.

In some embodiments, conference management server 150 may automatically unmute the microphone of a participant's device as soon as the participant starts speaking. For example, conference management server 150 may perform remote operations by sending signals to the participant's device causing the microphone to unmute. In some embodiments, conference management server 150 may further record the utterance of the participant while the microphone of his device is on mute. Upon receiving instructions from the participant's device, conference management server 150 may play the recorded utterance by transmitting associated audio signals to the user devices of other participants.

In some embodiments, conference management server 150 may determine that a participant is being addressed or mentioned, or a participant is the designated speaker for a certain portion of the conference, based on, for example, audio and video signals received from the participants' devices during the conference. Conference management server 150 may send notifications to the corresponding participant's device indicating the determination. For example, if conference management server 150 determines that the name "John Doe" is being mentioned, conference management server 150 may send a notification to a corresponding user device of John Doe indicating that his name is being mentioned. Conference management server 150 may further unmute the microphone of John Doe's device such that John Doe may respond promptly. As another example, conference management server 150 may determine that a section of the conference is a presentation by a certain participant. Conference management server 150 may send a notification to the corresponding participant's device, prior to the start time of the presentation. The notification may indicate that the participant is expected to speak or that the participant should unmute the microphone of his device.

Figure 8:
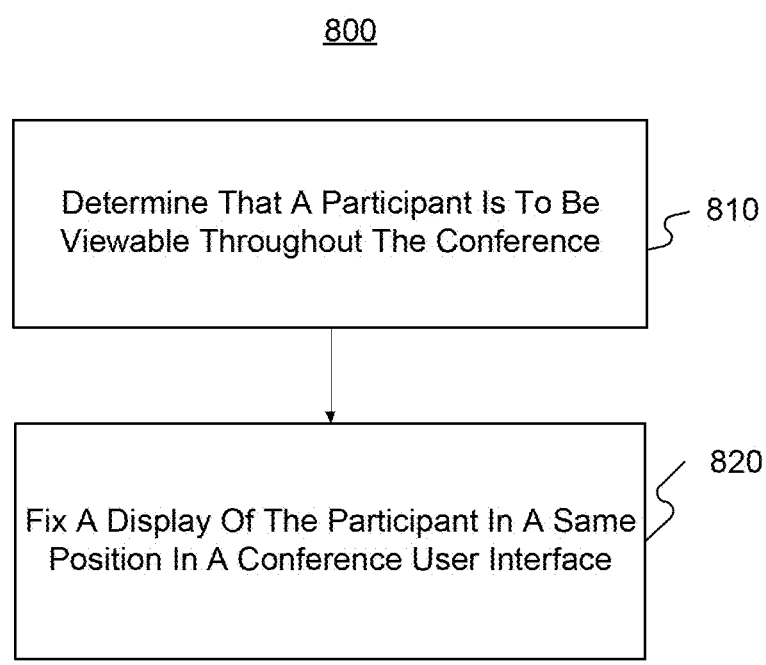
FIG. 8 is a flowchart of an example process for adjusting a display position of a participant, in accordance with some embodiments of the present disclosure.

FIG. 8 is a flowchart of an example process 800 for adjusting a display position of a participant, in accordance with some embodiments of the present disclosure. The steps associated with this example process may be performed by, for example, a processor 310 of conference management server 150 as shown in FIG. 3.

In step 800, based on the received conference information, conference management server 150 determines that a certain participant is to be viewable throughout the conference or throughout a certain portion of the conference. For example, the conference information may indicate that the conference is a presentation by a certain participant who is to be viewed by the other participants. As another example, the conference information may indicate that the conference includes interviewing a certain participant by the other participants. Conference management server 150 may determine the presenter or the interviewee is to be viewable throughout the conference. In some embodiments, conference management server 150 may receive information indicating that other participants would like a certain participant to be viewable throughout a portion or the entirety of the conference.

In step 820, based on the determination, conference management server 150 may fix or set the display of the participant in a same position in a conference user interface. For example, throughout the conference display of the participant may be fixed in the top center of a conference user interface. As shown in the example user interface in FIG. 10, conference management server 150 fixes the display of John Doe in a top center of the user interface. This way the other participants may be able to view the participant throughout the conference, without the confusion caused by changes of display positions.

In some embodiments, conference management server 150 may fix or set the display of a certain participant in other positions of the user interface or adjust the display size of that participant to be bigger than that of other participants. In some embodiments, conference management server 150 may display one or more participants who are actively interacting, or participants that often interact with each other, while masking display of the other participants. For example, if two participants are actively discussing a certain subject while the other participants are observing, conference management server 150 may display only the two active participants or decrease the display size of the non-active participants.

In some embodiments, conference management server 150 may determine potential active participants and adjust display of the participants accordingly. For example, conference management server 150 may determine that participants from the Operations Department and the Engineering Department are active participants at a conference regarding office renovations, as these participants often interact with each other on such topics. Conference management server 150 may accordingly display only the determined active participants and mask the display of participants from the Legal Department, as the Legal Department may not often be involved in such discussion. In some embodiments, whether a certain participant is active may be determined from the audio and video signals received from the corresponding participants' devices during the conference. For example, if a participant is constantly looking into the camera or frequently speaking, conference management server 150 may determine the participant is actively participating, and adjust the display of the participant accordingly.

Figure 9:
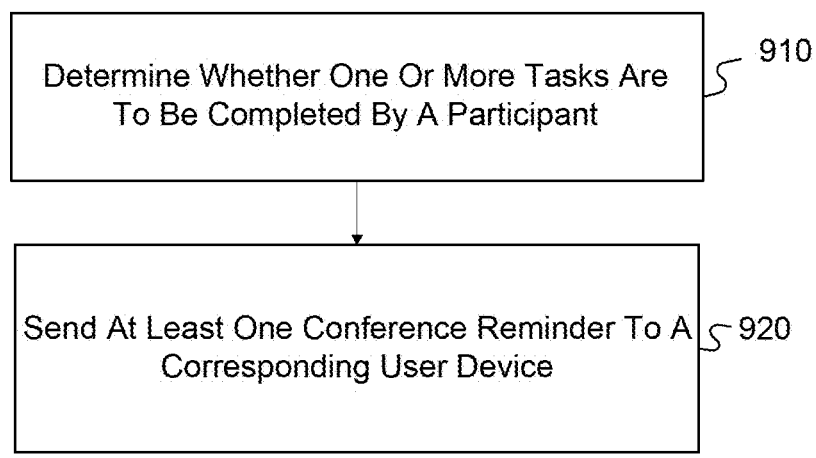
FIG. 9 is a flowchart of an example process for providing a conference reminder, in accordance with some embodiments of the present disclosure.

FIG. 9 is a flowchart of an example process 900 for providing a conference reminder, in accordance with some embodiments of the present disclosure. The steps associated with this example process may be performed by, for example, a processor 310 of conference management server 150 as shown in FIG. 3.

In step 910, conference management server 150 determines, based on the received conference information, whether one or more tasks are to be completed by a participant prior to the conference. For example, if the conference information indicates a participant is to give a presentation during a conference, conference management server 150 may determine that presentation materials need to be prepared by the participant prior to the conference. In some embodiments, the conference information may include information indicating items to be discussed or addressed at a conference. For example, the conference information may include an agenda indicating one session as discussing a marketing proposal presented by the marketing team. Conference management server 150 may determine that the marketing proposal needs to be prepared or uploaded by corresponding participants in the marketing team prior to the conference.

In step 920, based on the determination, conference management server 150 may send at least one conference reminder to a corresponding participant's device, the conference reminder indicating the one or more tasks. In some embodiments, conference management server 150 may send conference reminders at an earlier time to participants who need to complete one or more tasks prior to the conference than to participants who do not have prerequisite tasks to complete. For example, if a participant is to present a proposal at a conference, conference management server 150 may send a conference reminder to that participant a week or two days before the scheduled conference time, and send reminders to the other participants one day, half a day, or 15 minutes before the scheduled conference time. This way, participants who need to complete tasks prior to the conference may receive notifications well ahead of time and have sufficient time to prepare.

In some embodiments, conference management server 150 may send multiple reminders to the participants and may change the frequency of reminders. For example, if a certain participant is tasked to complete presentation slides by a certain date, conference management server 150 may monitor whether the slides are modified, updated, or uploaded. If the slides are not uploaded by the designated deadline, conference management server 150 may send conference reminders to the participant at a higher frequency as the deadline approaches, for example, from once a week to every other day. Further, if the slides are updated or uploaded to a designated forum, conference management server 150 may send a corresponding notification to the other participants.

In some embodiments, the conference information may further indicate assistance needed for the conference, such as setup of video conferencing equipment, catering service, or conference venue. Conference management server 150 may send notifications to corresponding participants or non-participants to request assistance. For example, conference management server 150 may determine based on the conference information that the conference includes a video conferencing session in a conference room. Conference management server 150 may then send notifications to the IT department requesting assistance in setting up video conferencing equipment in the designated conference room. As another example, conference management server 150 may send notifications to the facilities department requesting setup of the conference room prior to the conference or requesting cleaning service after the conference.

In some embodiments, conference management server 150 may verify the system settings of the participants' devices prior to or during the conference. For example, conference management server 150 may verify system settings regarding the imaging system configurations, camera positioning, audio system configurations, display configurations, internet connection, and bandwidth associated with the participants' devices. This way, conference management server 150 may ensure the participants' devices satisfy the requirements for the conference, and send notifications if adjustments are needed.

FIG. 10 is a diagram of an example teleconferencing user interface, in accordance with some embodiments of the present disclosure. The user interface may be shown on a display of a user device, such as user device 120 described with reference to FIG. 1. Components and layout of the user interface may vary depending on the actual implementation or the configurations of the user devices, which are not limited by the embodiments disclosed herein. As shown in FIG. 10, the teleconferencing user interface in this example includes a conference information section 1010, a video display section 1020, a chat section 1030, and a notification section 1040.

Conference information section 1010 includes lists of participants, such as video dial-in list 1011 and audio dial-in list 1012. Conference information section 1010 further includes team section 1013. In some embodiments, team section 1013 may allow the participants to search and add other team members to the current conference. Conference information section 1010 further includes a calendar button 1014, a tasks button 1015, and a files button 1016. Calendar button 1014 may allow the user to access and modify calendar items, such as conference-related tasks, appointments, and future conferences. Tasks button 1015 may allow the user to add or update tasks and change the status of the tasks. Files button 1016 may allow the user to access and share conference-related materials such as files and links. In some embodiments, calendar button 1014, tasks button 1015, and files button 1016, may function as a shared communication forum, to which participants of the conference may have shared access. In some embodiments, when new information is added to or modified in the shared communication forum, conference management server 150 may send a corresponding notification to the participants regarding the updates.

Video display section 1020 further includes video display of the participants. As shown in FIG. 10, the display of John Doe may be in a center position, and may be of bigger size than display of the other participants. Conference management server 150 may adjust display positions and sizes of the participants based on whether they are actively participating or whether certain participants are to be viewable throughout a certain portion of the conference. Chat section 1030 serves as a chat forum where the participants may communicate with other participants, or non-participants. Notification section 1040 shows a notification message received from conference management server 150. For example, as described with reference to FIGS. 6A and 6B, conference management server 150 may send notifications to the participants' devices regarding deviations from appropriate demeanor. Notification section 1040 may be in different positions of the user interface and may be in different formats. Notification 1040 may further provide selection buttons associated with certain operations, such as to turn on the camera, to mute/unmute the microphone, to ignore the notification, and to disable the notification function. Selection of the buttons may cause the conference management server or the user device to perform the corresponding operations.

In the preceding disclosure, various example embodiments have been described with reference to the accompanying drawings. It will, however, be evident that various modifications and changes may be made thereto, and additional embodiments may be implemented, without departing from the broader scope of the disclosure as set forth in the claims that follow. The disclosure and drawings are accordingly to be regarded in an illustrative rather than restrictive sense.

Therefore, it is intended that the disclosed embodiments and examples be considered as examples only, with a true scope of the present disclosure being indicated by the following claims and their equivalents.

What is claimed is:

1. A conference management server for enhanced conference management, the conference management server comprising:
   a memory storing a set of instructions; and
   at least one processor configured to execute the instructions to:
      receive, from a user device, conference information including a conference subject and an identification of at least one participant;
      determine, based on the received conference information, a degree of formality for a conference;
      send a conference notification to one or more user devices identified based on the conference information, the conference notification including information reflecting the degree of formality for the conference; and
      verify, based on the conference information, system settings of user devices associated with one or more participants prior to the conference.

2. The conference management server of claim 1, wherein
   the conference information further includes dress code information and venue information; and
   the degree of formality is determined based on at least one of: the conference subject, the identification of at least one participant, the dress code information, and the venue information.

3. The conference management server of claim 1, wherein the at least one processor is further configured to execute the instructions to:
   receive an image from a user device associated with a participant;
   identify a position of an object in the received image; and
   send, based on the identified position, a camera adjustment notification to the user device associated with the participant.

4. The conference management server of claim 1, wherein the at least one processor is further configured to execute the instructions to:
   receive audio and video signals from a user device associated with a participant;
   identify, based on the received signals, a deviation from appropriate demeanor corresponding to the determined degree of formality, the deviation including at least one of a deviation in physical appearance, a deviation in speaking rate, a deviation in speaking tone, and a deviation in utterance content; and
   send, based on the identified deviation, a deviation correction notification to the user device associated with the participant.

5. The conference management server of claim 4, wherein the at least one processor is further configured to execute the instructions to:
   limit a display size of the participant;
   mask display of the participant; or
   turn off a camera of the user device associated with the participant before the deviation is corrected.

6. The conference management server of claim 1, wherein the at least one processor is further configured to execute the instructions to:
   receive audio and video signals from a user device associated with a participant;
   determine, based on the received audio and video signals, that the participant is speaking with a microphone of the user device associated with the participant being on mute; and
   send a microphone operation notification to the user device associated with the participant.

7. The conference management server of claim 1, wherein the at least one processor is further configured to execute the instructions to:
   determine, based on the conference information, whether only one or more participants are to be viewable; and
   display, based on the determination, the one or more participants, while masking display of other participants.

8. The conference management server of claim 1, wherein the at least one processor is further configured to execute the instructions to:
   determine, based on the conference information, whether a participant is to be viewable throughout the conference; and
   fix, based on the determination, display of the participant in a same position.

9. The conference management server of claim 1, wherein the at least one processor is further configured to execute the instructions to:
   determine, based on the received conference information, whether one or more tasks are to be completed by a participant prior to the conference; and
   send, based on the determination, at least one conference reminder to a corresponding user device, the conference reminder indicating the one or more tasks.

10. The conference management server of claim 1, wherein the at least one processor is further configured to execute the instructions to:
    determine, based on the received conference information, assistance needed for the conference; and
    send, based on the determination, an assistance request to one or more corresponding user devices.

11. A computer-implemented method for enhanced conference management, comprising:
    receiving, from a user device, conference information including a conference subject and an identification of at least one participant;
    determining, based on the received conference information, a degree of formality for a conference;
    sending a conference notification to one or more user devices identified based on the conference information, the conference notification including information reflecting the degree of formality for the conference; and
    verifying, based on the conference information, system settings of user devices associated with one or more participants prior to the conference.

12. The computer-implemented method of claim 11, further comprising:
    receiving an image from a user device associated with a participant;

identifying a position of an object in the received image; and sending, based on the identified position, a camera adjustment notification to the user device associated with the participant.

13. The computer-implemented method of claim 11, further comprising:

receiving audio and video signals from a user device associated with a participant;

identifying, based on the received signals, deviation from appropriate demeanor corresponding to the determined degree of formality, the deviation including at least one of a deviation in physical appearance, a deviation in speaking rate, a deviation in speaking tone, and a deviation in utterance content; and sending, based on the identified deviation, a deviation correction notification to the user device associated with the participant.

14. The computer-implemented method of claim 13, further comprising:

limiting a display size of the participant;

masking display of the participant; or turning off a camera of the user device associated with the participant before the deviation is corrected.

15. The computer-implemented method of claim 11, further comprising:

receiving audio and video signals from a user device associated with a participant;

determining, based on the received signals, that the participant is speaking with a microphone of the user device associated with the participant being on mute; and sending a microphone operation notification to the user device associated with the participant.

16. The computer-implemented method of claim 11, further comprising:

determining, based on the conference information, whether only one or more participants are to be viewable; and displaying, based on the determination, the one or more participants, while masking display of other participants.

17. The computer-implemented method of claim 11, further comprising:

determining, based on the conference information, whether a participant is to be viewable throughout the conference; and fixing, based on the determination, display of the participant in a same position.

18. The computer-implemented method of claim 11, further comprising:

determining, based on the received conference information, whether one or more tasks are to be completed by a participant prior to the conference; and sending, based on the determination, at least one conference reminder to a corresponding user device, the conference reminder indicating the one or more tasks.

19. A non-transitory computer readable medium that stores a set of instructions which, when executed by at least one processor of a conference management server, causes the conference management server to perform a method for enhanced conference management, the method comprising:

receiving, from a user device, conference information including a conference subject and an identification of at least one participant;

determining, based on the received conference information, a degree of formality for a conference;

sending a conference notification to one or more user devices identified based on the conference information, the conference notification including information reflecting the degree of formality for the conference; and verifying, based on the conference information, system settings of user devices associated with one or more participants prior to the conference.

\* \* \* \* \*

UNITED STATES PATENT AND TRADEMARK OFFICE
CERTIFICATE OF CORRECTION

PATENT NO. : 9,967,520 B1
APPLICATION NO. : 15/640393
DATED : May 8, 2018
INVENTOR(S) : Christopher Van Rensburg et al.

Page 1 of 1

It is certified that error appears in the above-identified patent and that said Letters Patent is hereby corrected as shown below:

On the Title Page

Item (72) the name of Inventor Christopher VAN RENSBURG should read "VAN RENSBURG" as the last name, rather than "Christopher Van RENSBURG."

Signed and Sealed this
Thirty-first Day of July, 2018

Andrei Iancu
*Director of the United States Patent and Trademark Office*